April 29, 1958  J. L. RANDLES  2,832,457
ORIENTATOR FOR C-SHAPED ARTICLES
Filed Oct. 22, 1954  3 Sheets-Sheet 1

INVENTOR.
JOSEPH L. RANDLES
BY
*Eber J. Hyde*
ATTORNEY

April 29, 1958   J. L. RANDLES   2,832,457
ORIENTATOR FOR C-SHAPED ARTICLES
Filed Oct. 22, 1954   3 Sheets-Sheet 2
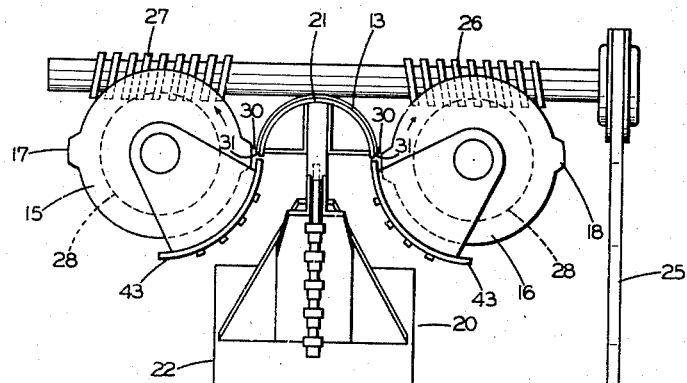
FIG. 2
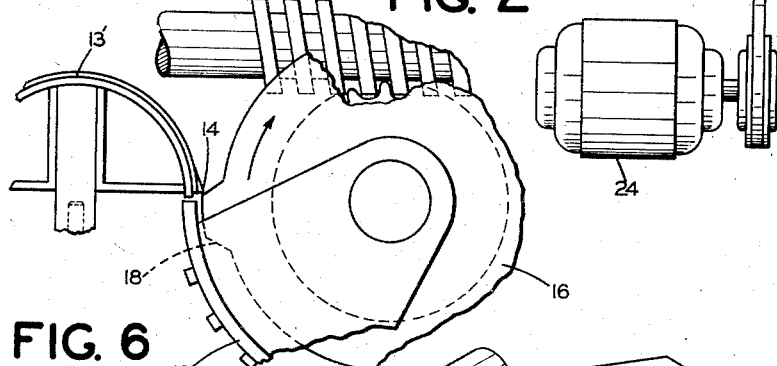
FIG. 6
FIG. 3
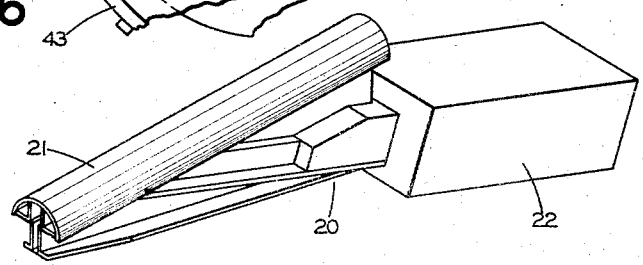
FIG. 5
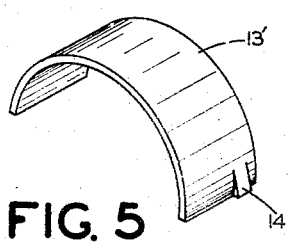
INVENTOR.
JOSEPH L. RANDLES
BY
*Eber J. Hyde*
ATTORNEY

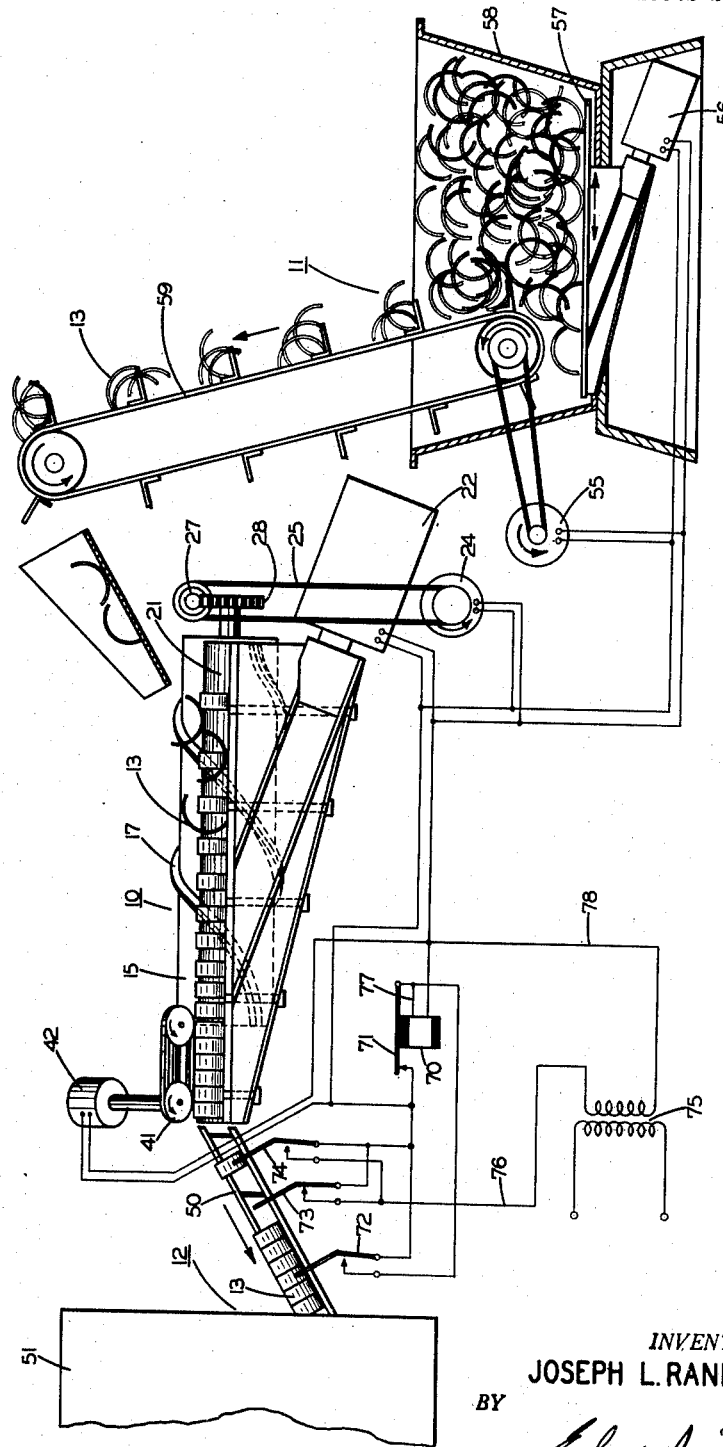

United States Patent Office 2,832,457
Patented Apr. 29, 1958

2,832,457

ORIENTATOR FOR C-SHAPED ARTICLES

Joseph L. Randles, Willoughby, Ohio, assignor to Clevite Corporation, Cleveland, Ohio, a corporation of Ohio Application October 22, 1954, Serial No. 464,046

7 Claims. (Cl. 198—33)

This invention pertains to an apparatus for orienting articles disposed in helter-skelter relationship, and more particularly to an apparatus for orienting C-shaped articles such as halves of sleeve bearings and the like which may have a soft inner lining of bearing metal.

The present state of the art of producing metal articles is such that the production machine tools can rapidly act on the articles. The articles to be worked must of course be fed to the machine tools in a fixed or oriented position. Thus one of the problems of production engineers is to provide automatic mechanisms for orienting articles to be fed to machine tools. When such orienting equipment is not available it means a person must be hired to feed the articles in oriented position to the machine tool. Sometimes one operator can keep up with several machines, but even so some of the value of the highly automatic machine tool is lost when an operator must be hired to feed articles to it.

It is an object of the present invention to provide an apparatus for orienting articles which are generally C-shape so that the articles can be fed in oriented position to a machine.

Another object of the present invention is to orient a plurality of C-shaped bearing halves from a helter-skelter condition with a minimum of agitation.

A further object of the invention is to orient C-shaped sleeve bearing halves from a helter-skelter condition, and to feed the oriented bearing halves to a machine tool in large regulated quantities without damaging the bearing halves by scratching and nicking them.

Another object of the present invention is to provide an orienting mechanism which will accept a plurality of unoriented C-shaped articles and will orient the articles with a minimum of agitation by lifting them and turning them to cause them to fall in an oriented position.

For a better understanding of the present invention, together with other and further objects thereof, reference is had to the following description taken in connection with the accompanying drawings, and its scope will be pointed out in the appended claims.

As aspect of the invention is the provision of an apparatus for orienting articles such as C-shaped bearing halves from a helter-skelter condition into an oriented position, and to feed the oriented articles to a machine tool or other device in large regulated quantities. The apparatus comprises orienting means engaging the unoriented articles for turning them and moving them in one direction. Adjacent to the orienting means is an advancing means for receiving the articles when they are properly oriented and for advancing them in the opposite direction free from contact with the orienting means. The articles should not be fed to the orientator at too fast a rate, so another aspect of the invention, in combination with the orientator, is the provision of control means actuated in accordance with the supply of oriented articles in the machine tool, for controlling the orientator and for controlling the supply of unoriented articles fed to the orientator.

With reference to the three sheets of drawing,

Figure 2 is an end view showing the mechanism for driving the orientator;

Figure 3 is an isometric view of a portion of the orientator called the advancing means;

Figure 4 is a side view of the orientator, the machine tool which is being fed by the orientator, the mechanism for feeding the orientator and the automatic control for the several parts;

Figure 5 is an isometric view of a C-shaped sleeve bearing;

Figure 6 is an enlarged view of a portion of the orientator for C-shaped sleeve bearings.

Figure 1:
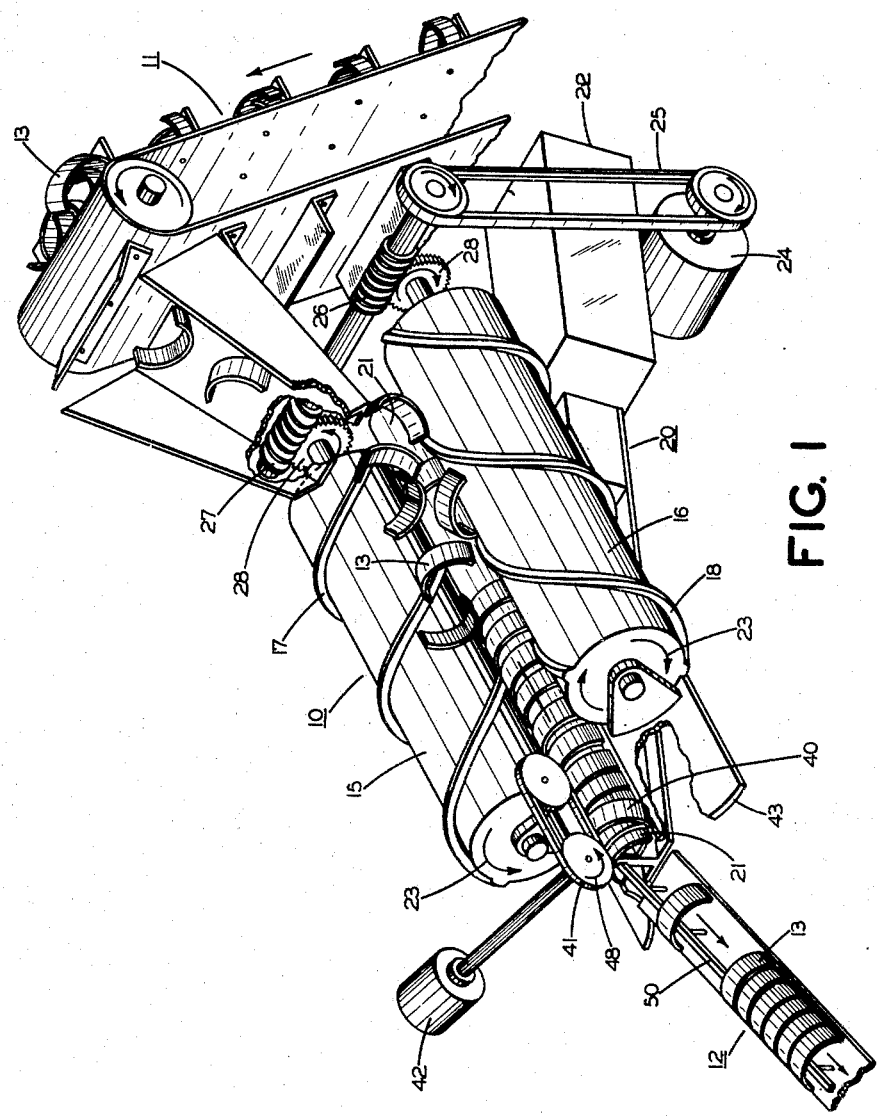
Figure 1 is an isometric view showing primarily the orientator.

As shown in Figure 1, in one aspect, the device of this invention comprises an apparatus, identified generally by reference character 10, for orienting articles disposed in helter-skelter relationship, and in a second aspect, comprises the orientator 10 in combination with a supply means identified generally by reference character 11, a means for using the oriented articles identified by reference character 12, and as shown in Figure 3, a means for controlling the supply means 11 and the orientator 10 in accordance with a predetermined condition of the supply of oriented articles in the utilizing means 12.

The article which is most effectively oriented by the orientator 10 is a half of an automobile sleeve bearing 13, though the orientator will operate with any C-shaped article, and with suitable changes in the shape of the rail, to be described later, can easily be made to operate on a wide range of different sized C-shaped articles.

The orientator 10 is comprised of orienting means, shown as parallel rollers 15, 16 spaced apart a short distance and each carrying article engaging devices such as the helical ridge 17, 18 for engaging and gently lifting and turning a plurality of the articles 13 which are dumped in helter-skelter relationship between the rollers 15, 16. Between the rollers 15, 16 there is positioned an article advancing means indicated generally by the reference character 20, including a rail 21 located between and parallel to the rollers 15, 16 and with its upper edge well below the upper edges of the two rollers 15, 16. A vibrating mechanism 22 is connected to the rail 21 for vibrating the rail with a motion which causes properly oriented articles 13 mounted on the rail 21 to move forward toward the device 12 for utilizing the articles. The article advancing means 20 is commercially available, but the rail 21 is specially sized and shaped in accordance with the size and shape of the articles to be oriented.

The rollers 15, 16 and the rail 21 of the article advancing means 20 form, in effect, a container into which the supply means 11 deposits a stream of articles 13. The rollers 15, 16 are rotated in opposite directions, as indicated by the arrows 23, by motor 24 through belt 25, worms 26, 27 and gears 28. The worms 26, 27 are oppositely pitched so that the rollers 15, 16 are driven in opposite directions. As shown by the arrows 23 it is necessary that the rollers 15, 16 rotate in such a direction that they tend to lift the articles 13 up from the article advancing rail means 21, and the helical ridges 17, 18 are wound about the rolls 15, 16 with a 45 degree spiral in such a direction that as they gently lift the articles 13 they tend to move them in a direction away from the article using means 13. This keeps the unoriented articles 13 in a loose, gently moving mass and prevents jamming of the articles between the rolls 15, 16 and the rail 21, and it prevents interlocking of the articles with each other. Further, the rollers and the helical ridges being, in effect, endless, prevent undue nicking and scratching of the articles. The sides of the helical ridges are at an angle of about 45 degrees to the top of the ridge, as shown in Fig. 2. As the rolls 15, 16 turn, the sides of the ridges 17, 18 engage the C-shaped articles up from the rail 21, at the same time turning them so that they tend to fall back toward the rail 21 in an oriented position. If they are properly oriented they rest on the rail and are then carried forward to the machine 12 where they are used. If they are not properly oriented they are moved back toward the supply means 11, and when the next helical ridge comes around they are again lifted and turned into an oriented position. The action of the rollers 15, 16 on the articles is such that each article quickly is moved into an oriented position and is then carried away by the article advancing means. Thus the article, such as a bearing half, undergoes a minimum of agitation in reaching its oriented position. In order to permit the oriented articles to fall relatively undisturbed to the advancing rail it is important that the container formed by the two rolls 15, 16 and the advancing rail 21 is not too full of unoriented articles which would interfere with the proper fall of the article to the advancing rail.

As shown particularly by Figure 2, there is a space 30 between each of the rollers 15, 16 and the rail 21, and this space 30 is sufficiently large that an oriented article 13 in position on the rail 21 is out of engagement with the helical ridges 17, 18 on the rollers 15, 16, and accordingly is no longer lifted by the rollers. Thus the oriented article 13 will move forward on the rail 21 undisturbed by the helical ridges. However, as shown in Figure 1, those articles 13 which are not oriented engage the rollers and the helical ridges as well as the vibrating rail 21. Due to the direction of motion of the rollers 15, 16 and the direction in which the helical threads 17, 18 are wound about the rollers, these unoriented articles are moved toward the supply means 11 and as they are moved they do through a series of orienting flips caused by engagement with the helical ridges. As soon as an unoriented article 13 is tumbled into an oriented position it drops down onto the vibrating rail 21 out of further engagement with the rollers and helical ridges. In its oriented position on the rail 21 the article will not be disturbed by the unoriented articles above it. One important reason for this is because its parting line edges, indicated by reference character 31 in Figure 2, are well below the level of the unoriented articles 13, and thus cannot be engaged and dislocated by an unoriented article.

Below the vibrating rail 21 and at either side thereof is a stationary guard 43. Each of these two guards is non-rotatably mounted to the shaft on which one of the rolls 15, 16 turns. The upper end of each of these guards is located closely adjacent the vibrating rail 21 to prevent the oriented bearings mounted on the rail from rotating with respect to the rail and sliding below the center-line of the rolls 15, 16, as shown in Figure 2.

It is of course desirable that the helical ridges 17, 18 on the rollers 15, 16 do not pick up the articles and carry them over the top of the rollers. It is also highly important that the articles do not interlock and get jammed between the rollers 15, 16 and the rail 21. In order to achieve these desirable results the lowest edges 31 of an oriented article 13 should be approximately on a line through the centers of the two rollers 15, 16, as shown in Figure 2, and the diameter of the rollers 15, 16 should be at least twice the diameter of the semi-circular rail 21. Also, the rollers should rotate at a speed just sufficient to flip the bearings over onto the vibrating rail, and as shown, it is preferable to have two helical ridges, one disposed 180 degrees from the other, about each roller 15, 16.

It sometimes happens that two articles 13 become oriented and positioned on the rail 21 with one article on top of the other, as shown at 40 in Figure 1. This is undesirable, and occasionally, unless prevented, this second article 40 will ride double all the way to the means 12 for using the articles. In order to prevent the doubled-up article 40 from entering the utilizing means 12, a rotating wheel device 41 is mounted adjacent the end of the vibrating rail 21. The wheel is rotated by a gear head or by a motor 42 in the direction shown by the arrow 48. The wheel device 41 is adjusted so that it will engage the edge of the doubled-up article 40 but will not engage the edge of the oriented article 13 underneath it. When such a doubled-up article 40 engages the rotating brush 41 it is lifted up and flipped off to one side. As a precaution against jamming, the wheel 41 may be pivotably mounted so that in the event an article tends to jam between the rail 21 and the wheel device, the wheel device will pivot to relieve undesired high forces and simultaneously will knock the article out of the way.

If the C-shaped articles to be oriented are automobile bearings, as shown in Figure 5, there is an added complicating factor in that each bearing has a notch 14 adjacent one parting line but there is no notch adjacent the other parting line. Consequently, in order to orient the bearings, it is essential that all of the notches 14 be located to one side of the rail 21. As shown in Figure 2, for symmetrical articles 13 the two rollers 15, 16 are equally spaced from the rail 21, but as shown in Figure 6, if the article 13' is an automobile bearing which is not completely symmetrical due to the notch 14, the roller 16 is moved in sufficiently close to the rail 21 that upon rotation the helical ridge 18 engages the underneath surface of the notch 14 and dislodges the bearing 13 even though it is in position on the rail. Thus all bearings 13' which fall to the rail 21 with the notch 14 on the wrong side will be dislodged, leaving only the completely oriented bearings to progress to the bearing using device 12.

It is desirable to keep an adequate supply of unoriented articles in the container formed by the rollers 15, 16 and the rail 21, but too many tends to reduce the efficiency of the orientator 10 by interfering with the fall of oriented articles onto the rail 21, and tends to increase the possibility of scratching and nicking of the articles. Thus the invention contemplates feeding a controlled stream of unoriented articles 13 to the orientator 10 by supply means 11, and to control the supply of unoriented articles 13 to the orientator 10 in accordance with the supply of oriented articles 13 in the article utilizing means 12.

Thus if the utilizing means 12 is a machine tool for further operating on the article or if it is a packaging machine, a supply of the oriented articles 13 is maintained on an inclined rail 50 leading to the tool or packaging machine 12. Gravity or other type of feed may be used for maintaining the oriented articles 13 in closely spaced side-by-side relationship and for advancing them into the device 12.

It is desirable to operate the orientator 10 and the supply means 11 when the supply of oriented articles on the rail 50 reaches a predetermined low condition and to terminate the operation when the rail 50 is filled with oriented articles. It is also highly undesirable to start and stop the machine too frequently. To satisfactorily control the flow of C-shaped articles from the supply bin 58 of the supply means 11 to the article using device 12 without frequently starting and stopping the orientator and the supply means 11, there is provided an electric circuit for controlling the energization of the several drive motors 22, 24, 55, 56 and 42 in accordance with the number of oriented articles 13 awaiting entrance to the utilizing means 12.

The electric circuit comprises a relay 70, a relay actuated switch 71 which is held closed when the relay 70 is energized, and three switches 72, 73, 74 mounted adjacent the storage rail 50. Switches 72, 73, 74 are normally closed and are opened by articles mounted on the rail 50 adjacent the switch.

When the supply of articles 13 on the storage rail 50 drops below switch 72, and requires replenishment, switch 72 closes thereby establishing a circuit from the electrical supply 75 through line 76, through the two parallel connected closed switches 73, 74, through closed switch 72, through 77, through relay 70, and through 78 back to the other side of the supply 75. This energizes relay 70 causing switch 71 to close and remain closed so long as the relay 70 is energized. Switch 71 is in parallel with switch 72, and in series with the parallel connected switches 73, 74. With either one of switches 71, 72 closed and either one of switches 73, 74 closed, an electric circuit is made through the motors 22, 24, 42, 55, 56 causing the C-shaped articles to progress from the supply 58, through the orientator 10 to the rail 50. As each oriented article slides down the rail 50 it momentarily opens each of the switches 74, 73, 72, and as the supply of oriented articles stored on the rail 50 passes the switch 72 the switch is opened and remains open. Switch 71 remains closed, however, due to the action of energized relay 70 and due to the fact that at least one of the switches 73, 74 remains closed as the articles slide past them. The spacing between switches 73, 74 is such that one article sliding down the rail 50 will not simultaneously open both switches. Accordingly, the motors are maintained energized until the supply of articles on the rails builds up to a point past switch 73, thereby opening both switches 72, 73. The next oriented article which slides down the rail opens switch 74 which deenergizes relay 77 and causes switch 71 to open. All of the motors are thereby deenergized and remain so until switch 72 is again closed to start the equipment operating to fill up the supply rail 50.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An apparatus for orienting C-shaped articles disposed in helter-skelter relationship comprising two parallel spaced apart rolls each having a raised helical article engaging screw thread thereon for receiving between them in helter-skelter arrangement a plurality of said articles for turning and lifting them and for tending to move them in one direction, advancing means located between said parallel rolls for engaging said articles when they are properly oriented and for advancing said articles in the opposite direction free from contact with said two rolls, and guard means positioned below and adjacent to said advancing means and adjacent to said rolls to prevent said articles from falling between said rolls and said article advancing means.

2. An apparatus for orienting C-shaped articles disposed in helter-skelter relationship comprising two parallel spaced apart rolls each having a helical article engaging screw means thereon, feed means at one end thereof for depositing between said rolls in helter-skelter arrangement a plurality of said articles, means rotating said rolls in opposite directions to each other for turning said articles and causing said helical threads to tend to lift the articles up from between the rolls and to move them in one direction toward said feed means, and advancing means located between said parallel rolls for engaging each article as it becomes properly oriented and for advancing it in the opposite direction away from said feed means free from contact with said two rolls.

3. An apparatus for orienting C-shaped articles disposed in helter-skelter relationship comprising two parallel spaced apart rolls each having a helical article engaging screw thread thereon, article advancing means comprising a vibratable rod, the upper surface of which is shaped to receive and closely engage the underneath surface of said articles located between said two rolls and forming with said rolls a container for receiving in helter-skelter arrangement a plurality of said articles, means rotating said rolls in opposite directions with respect to each other thereby causing said helical threads to lift the articles up from said article advancing means and to turn the articles to tend to orient them and move them in one direction, and vibrator means driving said article advancing means for advancing the oriented C-shaped articles in the opposite direction, the spacing between said article advancing means and said rolls being such that a properly oriented article engages only said article advancing means and is thereby moved in said opposite direction free from contact with said two rolls.

4. An apparatus for orienting C-shaped articles disposed in helter-skelter relationship comprising orienting means engaging said helter-skelter disposed C-shaped articles for lifting and turning them and moving them in one direction, and advancing means located adjacent to but spaced from said orienting means and having an upper surface whose configuration conforms to and is slightly smaller than the concave surface of said C-shaped articles for receiving said articles when they are orientated and moving them in the opposite direction, the upper surface of said advancing means being located below the upper surface of said orienting means and the said spacing between said orienting means and said advancing means being such that said C-shaped articles when oriented and engaging said advancing means are free from engagement with said orienting means.

5. An apparatus for orienting C-shaped articles disposed in helter-skelter relationship comprising, in combination, two parallel spaced apart rolls having article engaging means on the surface thereof for tending to move the articles in one direction and for turning them, article advancing means located between and spaced from said two rolls and forming with said rolls a container for receiving in helter-skelter arrangement a plurality of said articles, means rotating said rolls in opposite direction with respect to each other thereby moving said articles and causing said article engaging means to tend to lift said articles up from said article advancing means with a turning motion and to move them in one direction, means driving said article advancing means for advancing oriented articles in the opposite direction, the spacing between said article advancing means and said rolls being such that a properly oriented article engages only said article advancing means and is thereby moved in said opposite direction free from contact with said two rolls, means supplying said articles to said container in helter-skelter arrangement, means adjacent said article advancing means for operating on said articles and having oriented article storing means, limit means actuated in accordance with the number of said oriented articles stored by said storage means for rendering said article advancing means and said means supplying articles to said container inoperative when a predetermined number of oriented articles are stored by said storage means.

6. An apparatus for orienting C-shaped automobile bearings having a raised notch at the parting line and disposed in helter-skelter relationship, comprising, two spaced apart rolls each having bearing engaging means on the surface thereof for receiving between them in helter-skelter arrangement a plurality of said articles and for returning them in order to orient them, and bearing advancing means located between said two parallel rolls closer to the bearing engaging means on one roll than to the bearing engaging means on the other for engaging said bearings when they are properly oriented and for advancing them free from contact with said two rolls, the bearing engaging means on said one roll which is closer to the said advancing means engaging said raised notch and lifting said bearing from said bearing advancing means when a bearing engages said bearing advancing means 180 degrees out of orientation.

7. An apparatus for orienting articles disposed in helter-skelter relationship comprising two parallel spaced apart rolls each including helical article engaging means, article advancing means located between said two rolls and spaced therefrom and forming with said rolls a container for receiving in helter-skelter arrangement a plurality of said articles, means rotating said rolls in opposite directions with respect to each other tending to raise articles located between said rolls and causing said helical means to engage said articles and turn them and to move said articles axially in one direction, the spacing between said articles advancing means and said rolls being such that a properly oriented article engages only said article advancing means, and vibratory means engaging said article advancing means and vibrating it with a motion causing said properly oriented articles thereon to move axially in the direction opposite to said one direction whereby improperly oriented articles are held in said container and properly oriented articles are moved out of said container.

References Cited in the file of this patent

UNITED STATES PATENTS

| | | |
|---|---|---|
| 1,916,255 | Cabot | July 4, 1933 |
| 1,970,574 | Pelosi | Aug. 21, 1934 |
| 2,377,431 | Lakso | June 5, 1945 |
| 2,596,798 | Thompson | May 13, 1952 |
| 2,632,554 | Wilcox | Mar. 24, 1953 |

FOREIGN PATENTS

| | | |
|---|---|---|
| 143,174 | Australia | July 1, 1949 |